3,271,337
OXETANE POLYMERS STABILIZED WITH AN EPOXIDE AND A STERICALLY HINDERED PHENOLIC COMPOUND

Robert F. Goddu, Kennett Square, Pa., assignor to Hercules Powder Company, Wilmington, Del., a corporation of Delaware
No Drawing. Filed May 28, 1963, Ser. No. 283,701
2 Claims. (Cl. 260—18)

This invention relates to new plastic compositions suitable for molding and other plastic uses and, more particularly, to stabilized polymers of 3,3-bis(chloromethyl) oxetane, which polymers retain their viscosity on exposure to heat, light, and other degrading influences.

Polymers of 3,3-bis(chloromethyl) oxetane having a molecular weight of at least 10,000 have physical properties which are highly desirable for the preparation of molded articles such as tubing, pipes, pipe fittings, gears, etc., as well as the many molded articles that may be prepared from other plastic compositions. While these polymers have a high degree of heat stability, they are subject to degradation when heated for long periods of time. Thus, while it is possible to produce molded or coated articles on a small or laboratory scale, for such articles to be produced on a commercial scale the polymer often must be maintained for extended periods of time at a temperature well above its melting point and usually in contact with oxygen, which frequently results in a considerable degradation of the polymer. Also, if the article is one that will be subjected to constant heat as in chemical reactors, piping for hot liquids, articles that require sterilization, etc., degradation of the polymer may occur resulting in the article becoming brittle. Another type of degradation that may be encountered is that caused by exposure for long periods of time to light and particularly to ultraviolet light, as may be the case in many applications of these polymers, with the result that a considerable amount of discoloration may occur as well as loss in flexibility.

In U.S. 2,947,722 to Boardman it has been suggested that the degradation of polymers of 3,3-bis(choromethyl) oxetane due to heat and light can be prevented by incorporating in the polymer certain phenols, phenolic esters, and phenolic ethers. By and large, these phenols do improve the heat stability of the polymer, but there is still a need for even greater improvement.

Now, in accordance with this invention, it has been found that the resistance of the polymers of 3,3-bis(chloromethyl) oxetane to degradation by heat and light can be improved by the incorporation of a small amount of 2,4,6-tris(4-hydroxy 3,5-di-t-butyl benzyl) mesitylene as a stabilizer for the 3,3-bis(chloromethyl) oxetane polymer in the composition prior to the fabrication of molded articles or use as a coating in laminated compositions, etc. Compositions comprising 3,3-bis(chloromethyl) oxetane polymers having a molecular weight of at least 10,000, and preferably having a molecular weight such that the specific viscosity of a 1% solution of the polymer in cyclohexanone at 50° C. is at least 0.3 in combination with the aforesaid stabilizer, are not subject to such polymer degradation and hence retain their flexibility, impact strength, and tensile strength. Such stabilized 3,3-bis(chloromethyl) oxetane polymers are of outstanding utility for the preparation of molded articles and coatings where high chemical resistance, flame resistance, and resistance to organic solvents, water, and the like are desired. One of the advantages of these stabilized compositions is that the articles prepared from them have a high degree of flexibility without the necessity of incorporating a plasticizer and hence are not subject to the many disadvantages inherent in the use of a plasticizer, such as migration and extraction of the plasticizer. On the other hand, the use of plasticizers is not precluded and may be desired to obtain an even greater degree of flexibility, particularly where a high order of shock resistance is required.

The 2,4,6-tri(4-hydroxy 3,5-di-t-butyl benzyl) mesityllene used as a stabilizer in accordance with the invention prevents the degradation of polymers of 3,3-bis(chloromethyl) oxetane markedly. An even further increase in stability can be achieved, however, by also incorporating an epoxide costabilizer in the polymer. The use of the costabilizer in addition to the 2,4,6-tris(4-hydroxy 3,5-di-t-butyl benzyl) mesitylene is a preferred embodiment of the invention.

The following examples will illustrate the advantages of the invention. All parts and percentages are by weight unless otherwise specified.

EXAMPLES 1–3

In these examples the effectiveness of 2,4,6-tris(4-hydroxy 3,5-di-t-butyl benzyl) mesitylene as a heat stabilizer was compared with the methylene bis(alkyl phenol) stabilizers of the prior art. The formulations were prepared by slurrying 100 parts 3,3-bis(chloromethyl) oxetane polymer having a specific viscosity of 1.33 (1% solution in cyclohexanone, measured at 50° C.) with an acetone solution containing 0.5 part of the desired additive, and the acetone evaporated by allowing the blended composition to dry overnight at room temperature and atmospheric pressure, followed by 12 hours at 80° C. in a vacuum oven under a nitrogen bleed. Each formulation of the dried, finely divided material was then extruded into a ribbon by means of a 1-inch N.R.M. extruder at a temperature of 375–380° F., and the ribbon subsequently chopped into pellets for use in molding powder. Pellets from each formulation were compression molded into plaques 6 x 6 x 1/16" for 8 minutes at 200° C. using a 4-minute preheat and 4 minutes under 10 tons force. The compression-molded plaques were then cut into ½ x 3" strips and tested for stability by exposing in an air-circulating oven at 300° F. for 5, 14, 19, and 27 days. After exposure, the strips were tested for tensile strength, elongation, and modulus in accordance with the procedure of ASTM D638 and for specific viscosity as measured on 1% solution in cyclohexanone at 50° C. A control was also prepared in the same manner except that the acetone solution did not contain any additive. The formulation for each example and the test results are recorded in Tables I and II below.

Table I

| Formulation (parts) | Control | Example No. | | |
|---|---|---|---|---|
| | | 1 | 2 | 3 |
| Polymer of 3,3-bis(chloromethyl) oxetane | 100 | 100 | 100 | 100 |
| 2,4,6-tris(4-hydroxy 3,5-di-t-butyl benzyl) mesitylene | | 0.5 | | |
| 2,3'-methylene-bis(4-methyl-6-t-butyl phenol) | | | 0.5 | |
| 4,4'-methylene-bis(2,6-di-t-butyl phenol) | | | | 0.5 |

Table II

| | Control | Example No. 1 | Example No. 2 | Example No. 3 |
|---|---|---|---|---|
| Unaged: | | | | |
| Tensile (p.s.i.) | 4,150 | 4,340 | 4,225 | 4,345 |
| Elongation (percent) | 150 | 250 | 215 | 265 |
| Modulus (p.s.i.) | 68,000 | 84,300 | 73,250 | 72,700 |
| Specific viscosity | 1.08 | 1.28 | 1.30 | 1.27 |
| After 5 days at 300° F.: | | | | |
| Tensile (p.s.i.) | 6,340 | 6,625 | 3,600 | 6,420 |
| Elongation (percent) | 5 | 23.5 | 23.0 | 24 |
| Modulus (p.s.i.) | 180,000 | 115,000 | 120,000 | 144,000 |
| Specific viscosity | .51 | | 0.86 | |
| After 14 days at 300° F.: | | | | |
| Tensile (p.s.i.) | (*) | 6,315 | 2,670 | 4,450 |
| Elongation (percent) | (*) | 15 | 2.3 | 5.5 |
| Modulus (p.s.i.) | (*) | 189,000 | 95,000 | 193,000 |
| Specific viscosity | 0.33 | 1.07 | 0.58 | 0.84 |
| After 19 days at 300° F.: | | | | |
| Tensile (p.s.i.) | (*) | 5,595 | (*) | (*) |
| Elongation (percent) | (*) | 8.5 | (*) | (*) |
| Modulus (p.s.i.) | (*) | 184,000 | (*) | (*) |
| Specific viscosity | (*) | 0.96 | (*) | (*) |
| After 27 days at 300° F.: | | | | |
| Tensile (p.s.i.) | (*) | 4,930 | (*) | (*) |
| Elongation (percent) | (*) | 6.6 | (*) | (*) |
| Modulus (p.s.i.) | (*) | 180,000 | (*) | (*) |
| Specific viscosity | (*) | 0.73 | (*) | (*) |

*Specimens degraded beyond testing.

EXAMPLE 4

The procedure of Example 1 was repeated except that in this case the acetone solution additionally contained 2.0 parts epoxidized linseed oil (9% oxirane oxygen) as costabilizer, the compression-molded plaque was cut into 1″ squares, and the squares were tested for stability by exposing in an air-circulating oven on aluminum foil at 450° F. for 1, 2, and 3 hours. After exposure, the extent of degradation of the polymer from each square was determined by measuring the specific viscosity at 50° C. using a 1% solution in cyclohexanone. Test data for this example, as compared with a first control prepared in the same manner but without the costabilizer and with a second control prepared without any additives, are recorded in Table III below.

Table III

| | Original | 1 hour $\eta$sp | 1 hour Percent loss | 2 hours $\eta$sp | 2 hours Percent loss | 3 hours $\eta$sp | 3 hours Percent loss |
|---|---|---|---|---|---|---|---|
| Example 4 | 1.26 | 0.93 | 26.1 | 0.83 | 33.1 | 0.61 | 51.5 |
| Control 1 | 1.28 | 0.94 | 26.5 | 0.83 | 35.1 | 0.50 | 60.9 |
| Control 2 | 1.28 | 0.84 | 34.0 | 0.50 | 58.0 | 0.20 | 84.0 |

EXAMPLES 5–7

The procedure of Example 4 was repeated using as costabilizer 2.0 parts respectively of phenyl phenoxy propylene oxide, epoxidized soybean oil (7% oxirane oxygen), and the condensation product of 2 moles of epichlorohydrin and 1 mole of 2,2-bis(4-hydroxyphenyl) propane (8% oxirane oxygen). In each case, the costabilizer markedly improved the ability of the 2,4,6-tris(4-hydroxy 3,5-di-t-butyl benzy) mesitylene to heat stabilize and prevent loss in viscosity of 3,3-bis(chloromethyl) oxetane polymer.

Any polymer of 3,3-bis(chloromethyl) oxetane, which may also be called 3,3-bis(chloromethyl oxacyclobutane, having a molecular weight of at least 10,000 can be stabilized in accordance with this invention to produce compositions suitable for molding, coating, etc. However, the higher the molecular weight of the polymer, the better the general physical properties. Hence, higher molecular weight polymers are generally preferred for the plastic compositions of this invention. Because the molecular weight of the higher molecular weight polymers is not as easily or accurately determined, it is simpler to define the most useful polymers in terms of their specific viscosities. Polymers having a specific viscosity, when measured as a 1% solution in cyclohexanone at 50° C., of at least about 0.3 are useful for the compositions of this invention and, preferably, the polymers used will have a specific viscosity (1% solution in cyclohexanone at 50° C.) of at least about 0.5, and more preferably from about 0.8 to 3 or above.

Copolymers of 3,3-bis(chloromethyl) oxetane and a minor amount of a copolymerizable monomer can also be stabilized in accordance with this invention. By the use of a copolymer, it is often possible to modify the physical properties of the 3,3-bis(chloromethyl) oxetane polymer in a desired manner for a specific end use. For example, the softening point may be raised or lowered, flexibility increased, etc. Exemplary of the monomers that may be copolymerized with 3,3-bis(chloromethyl) oxetane are other 3,3-disubstituted oxetanes such as 3,3-bis(fluoromethyl) oxetane, 3,3-bis(bromomethyl) oxetane, 3-chloromethyl-3-methyl oxetane, 3,3-dimethyloxetane, and 3,3-bis(phenoxymethyl) oxetane, other copolymerizable monomers such as oxetane, and other substituted oxetanes.

The amount of stabilizer that is incorporated in the composition for plastic uses may be varied over a wide range and will depend upon the degree of stabilization desired, but, in general, an amount of from about 0.1% to about 10%, and preferably from about 1 to about 5% by weight of the polymer of the stabilizer will adequately protect the fabricated articles from the degrading effects of heat and light. A larger amount of stabilizer may be used if desired, but generally is not necessary.

As previously mentioned, one of the preferred, but optional, embodiments of the invention comprises incorporating into the polymer an epoxide costabilizer in addition to the stabilizer. The epoxides which are useful as costabilizers in the preferred embodiment of the invention are numerous and varied. Typical useful epoxides include epoxidized oils such as epoxidized soybean oil, epoxidized cottonseed oil, epoxidized linseed oil, and the like; reaction products of epichlorohydrin with phenols such as the reaction product of epichlorohydrin and 2,2-bis(4-hydroxyphenyl) propane having the formula:

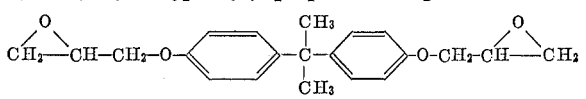

phenoxy propylene oxide, cyclohexene oxide, 1,2-epoxy hexadecene, glycidyl octyl ether, 9,10-epoxy butyl stearate, phenyl methyl glycidol, epoxy acetoxy stearin, dipentene diepoxide, vinyl cyclohexene diepoxide, dicyclopentadiene diepoxide, and the like. The epoxide compound, when used, preferably comprises from 0.01 to 4.0% by weight of the polymer.

Also effective as light stabilizers for the fabricated articles prepared from the compositions of this invention are ultraviolet light absorbers such as 2-hydroxy-4-methoxy phenyl benzophenone and inert materials such as fillers and pigments. While these materials do not act as stabilizers during fabrication, they are effective ultraviolet light screens for the finished articles.

Various other additives may be incorporated in the plastic compositions of this invention. For many purposes it may be desirable to incorporate various fillers, pigments, or other colorants, not only as ultraviolet light screens but for coloring, or to make less expensive plastic compositions by extending them with inert fillers. The amount of such materials which are added to the plastic compositions of this invention may, of course, be varied over a wide range. For example, titanium dioxide has been incorporated to impart color and graphite has been incorporated to provide lubricity in a polymer having a specific viscosity of 1.7 (1% solution in cyclohexanone at 50° C.) up to amounts of 50% by weight of the polymer and molded articles prepared from such compositions. Any of the other fillers frequently used in plastic compositions, as, for example, calcium carbonate and wood flour, may likewise be used in the plastic compositions of this invention. For the preparation of colored materials, the amount of pigment, or other colorant such as dyes, added will obviously depend upon the degree or shade of color desired.

For some purposes it may be desirable to incorporate a plasticizer in the plastic compositions of this invention. Plasticizers that may be used for incorporation in the compositions of this invention are the alkyl esters of carboxylic acids such as the alkyl stearates, oleates, sebacates, adipates, phthalates, and the like, as, for example, amyl stearate, butyl oleate, di-2-ethylhexyl adipate, dibutyl sebacate, dioctyl phthalate, di-2-ethylhexyl phthalate, n-octyl n-decyl phthalate, glycerol triacetate, glycerol tripropionate, pentaerythritol diacetate dibutyrate, dipentaerythritol diacetate dipropionate dibutyrate, and the pentaerythritol tetraester of mixed $C_4$ to $C_9$ acids; polyesters, such as the polyester of sebacic acid and ethylene glycol; phosphates, such as tricresyl phosphate, cresyl diphenyl phosphate, 2-ethylhexyl diphenyl phosphate; hydrocarbon oils, such as mineral oil, fluorinated chlorinated hydrocarbon oils, chlorinated diphenyl, o-chloronaphthalene; polyethers, such as the solid polyethylene glycols sold under the trade name Carbowax; and other polymeric materials such as styrene-acrylonitrile copolymers, polydimethyloxetane (polymerized 3,3-dimethyloxetane), and the like.

The stabilizers and costabilizers, if employed, used in accordance with this invention may be admixed with the polymer by any of the usual procedures for incorporating a stabilizer in a solid material. A simple method is to dissolve the stabilizers in a low boiling solvent such as acetone, methyl ethyl ketone, or methanol, and, after thoroughly mixing the solution with the polymer in flake or other such form, evaporating the solvent; or they may be incorporated by various means of mechanical mixing, etc.

The new plastic compositions of this invention comprising a polymer of 3,3-bis(chloromethyl) oxetane and the stabilizer therefor have a wide variety of applications. Among the many advantages of the compositions of this invention for the preparation of molded and extruded thermoplastics are their excellent chemical resistance, including water resistance and resistance to organic solvents, retention of strength at elevated temperatures, excellent physical strength, especially unnotched impact strength, excellent electrical properties, and outstanding dimenisonal stability. These compositions are of particular utility for the manufacture of extruded pipes and rigid and flexible tubing, injection-molded pipe fittings, bottle and tube caps, jar lids, buttons, combs, dinnerware and kitchen utensils, parts for household appliances, textile machinery parts, electrical equipment parts, gears, gaskets, squeeze bottles and jars.

Any of the molding processes used for molding thermoplastic materials may be used for molding the plastic molding compositions of this invention. They may be molded by compression-molding, transfer-molding, slush-molding, or splash-molding processes. These compositions are particularly advantageous because they may be injection-molded, which is the process most desirable commercially. In the case of the compositions of this invention, the injection-molding process produces a molded article having a molecularly oriented "skin" or "layer." This oriented surface film greatly increases the toughness and impact resistance of the article by a factor of 15–20 times. This has been demonstrated by testing an injection-molded strip ½ inch thick by the Izod impact strength test. When cut or notched 0.1 inch, it required 0.5 ft. lb./inch of notch to break, whereas, if unnotched, it takes 15–20 ft. lb./inch to break.

The compositions of this invention may also be used for coating or laminating, where chemical resistance is desired. Coatings of these compositions may be applied from solution in a solvent for the composition, as, for example, cyclohexanone, by hot-brushing, spreading by means of a blade, or spraying of the composition in molten form. Laminates may be prepared by building up the layers by means of a solution of the polymer or by molten polymer. They may also be formed by fusing layers of dry polymer between the material to be laminated. In any case, the coatings and laminates should be fused on the substrate by baking, as, for example, at a temperature of about 204° C. for 3–10 minutes, or by flash-fusing, as with a flame. This fusing will remove the solvent, if used, provide better transparency, and yield an even, glossy surface. It also improves the adhesion of the coatings to the substrate. These coatings will adhere to paper, metal, glass, etc. Hence, paper cartons may be made water- and solventproof or shatterproof glass may be prepared. Excellent fire-resistant insulating materials may also be prepared by using these compositions for binding glass fibers. Many other applications for the compositions of this invention will, of course, occur to those skilled in the art.

What I claim and desire to protect by Letters Patent is:

1. A polymeric composition consisting esentially of a mixture of a polymer of 3,3-bis(chloromethyl) oxetane and, as a heat and light stabilizer therefor, from about 0.1 to 10% by weight of the polymer of 2,4,6-tris(4-hydroxy-3,5,-di-t-butyl benzyl) mesitylene, and, as a co-stabilizer therefor, from about 0.01 to 4.0% by weight of the polymer of an epoxide compound selected from the group consisting of epoxidized soybean oil, epoxidized cottonseed oil, epoxidized linseed oil, the reaction product of epichlorohydrin and 2,2-bis(4-hydroxyphenyl) propane, said reaction product having the formula

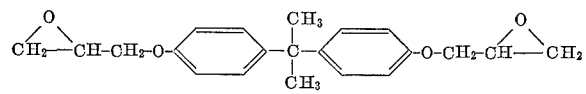

phenoxy propylene oxide, cyclohexene oxide, 1,2-epoxy hexadecene, glycidyl octyl ether, 9,10-epoxy butyl stearate, phenyl methyl glycidol, epoxy acetoxy stearin, dipentene diepoxide, vinyl cyclohexene diepoxide, and dicyclopentadiene diepoxide.

2. The composition of claim 1 in which the epoxide compound is epoxidized linseed oil.

References Cited by the Examiner

UNITED STATES PATENTS

| | | | |
|---|---|---|---|
| 2,722,487 | 11/1955 | McTigue | 260—2 |
| 2,722,492 | 11/1955 | Ralston | 260—2 |
| 3,026,264 | 3/1962 | Rocklin et al. | 260—45 |
| 3,168,492 | 2/1965 | Doyle | 260—45.95 |

LEON J. BERCOVITZ, *Primary Examiner.*

C. W. IVY, *Assistant Examiner.*